(12) United States Patent
Hussein et al.

(10) Patent No.: US 8,586,685 B2
(45) Date of Patent: Nov. 19, 2013

(54) POLYMERIZATION REACTION SYSTEM

(75) Inventors: F. David Hussein, Cross Lanes, WV (US); Michael E. Muhle, Kingwood, TX (US); Ping Cai, Lake Jackson, TX (US); Mark W. Blood, Hurricane, WV (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 13/377,205

(22) PCT Filed: Jul. 20, 2010

(86) PCT No.: PCT/US2010/042625
§ 371 (c)(1),
(2), (4) Date: Feb. 14, 2012

(87) PCT Pub. No.: WO2011/011427
PCT Pub. Date: Jan. 27, 2011

(65) Prior Publication Data
US 2012/0136127 A1 May 31, 2012

Related U.S. Application Data

(60) Provisional application No. 61/227,932, filed on Jul. 23, 2009.

(51) Int. Cl.
*C08F 2/12* (2006.01)
*B01J 19/24* (2006.01)
*C08F 10/02* (2006.01)

(52) U.S. Cl.
USPC ............ 526/70; 526/67; 526/918; 422/132; 422/134

(58) Field of Classification Search
USPC ......... 526/67, 68, 918, 70; 422/131, 132, 134
See application file for complete search history.

(56) References Cited

U.S. PATENT DOCUMENTS

| 3,709,853 A | 1/1973 | Karapinka |
| 4,003,712 A | 1/1977 | Miller |

(Continued)

FOREIGN PATENT DOCUMENTS

| WO | 9736942 A1 | 10/1997 |
| WO | 2006022736 A1 | 3/2006 |

OTHER PUBLICATIONS

Cai, P. et al "Polymerization Simulation Under Different Fluidization Regimes," Circulating Fluidized Bed Technology VIII, ed. By K. Cen, p. 410-417, International Academic Publishers (2005).

*Primary Examiner* — Fred M Teskin
(74) *Attorney, Agent, or Firm* — Jennifer A. Schmidt; Kristina Leavitt

(57) ABSTRACT

A process for the polymerization of olefins is disclosed. The process may include: feeding a catalyst, a liquid diluent, and an olefin to a polymerization vessel having, from a polymerization vessel bottom to a polymerization vessel top, a vapor introduction zone, a three-phase reaction zone and a vapor disengagement zone; contacting the catalyst and olefin under conditions of temperature and pressure in the presence of the liquid diluent as a continuous phase in the three-phase reaction zone to form a solid phase polyolefin; withdrawing a gas phase composition from an outlet in fluid communication with the vapor disengagement zone; circulating the gas phase composition through a gas circulation loop to an inlet in fluid communication with the vapor distribution zone at a rate sufficient to agitate the solid and liquid phases within the three-phase reaction zone; and withdrawing a reaction mixture comprising polyolefin and diluents from the three-phase reaction zone.

30 Claims, 5 Drawing Sheets

(56) References Cited

U.S. PATENT DOCUMENTS

| | | |
|---|---|---|
| 4,011,382 A | 3/1977 | Levine et al. |
| 4,302,566 A | 11/1981 | Karol et al. |
| 4,543,399 A | 9/1985 | Jenkins, III et al. |
| 4,882,400 A | 11/1989 | Dumain et al. |
| 5,352,749 A | 10/1994 | DeChellis et al. |
| 5,541,270 A | 7/1996 | Chinh et al. |
| 5,689,642 A | 11/1997 | Harkins et al. |
| 6,113,862 A | 9/2000 | Jorgensen et al. |
| 7,122,607 B2 | 10/2006 | Hagerty et al. |
| 7,300,987 B2 | 11/2007 | Hagerty et al. |
| 7,772,291 B2 * | 8/2010 | Steynberg .............. 518/700 |
| 2004/0064007 A1 | 4/2004 | Beech et al. |
| 2005/0245696 A1 | 11/2005 | Cole et al. |

\* cited by examiner

POLYMERIZATION REACTION SYSTEM

CROSS-REFERENCE TO RELATED APPLICATIONS

This application is a National Stage application under 35 U.S.C. §371 of International Application No. PCT/US2010/042625, filed Jul. 20, 2010, that claims the benefit of Ser. No. 61/227,932, filed Jul. 23, 2009, the disclosures of which are incorporated by reference in their entireties.

FIELD OF THE INVENTION

Disclosed herein are three-phase polymerization reaction systems. More specifically, embodiments disclosed herein relate to three-phase polymerization reaction systems useful for the production of polyolefins, such as polyethylenes and polypropylenes.

BACKGROUND

There are many different processes for the polymerization of olefins, including gas-phase fluidized bed processes, slurry loop or stirred tank reactors, suspension and solution processes.

For example, it is well known that many polymers can be produced as powders in gas-phase fluid bed reactors, where the fluidization of the polymeric solids is provided by a circulating mixture of gases including one or more monomers. This type of polymerization process is a common process, widely used for the production of polyolefins, such as polyethylene, polypropylene, and polyolefin copolymers. One particular arrangement of a fluid bed polyolefin process is disclosed in U.S. Pat. No. 4,882,400. Other examples of fluid bed polyolefin technology are described in, for example, U.S. Pat. Nos. 3,709,853; 4,003,712; 4,011,382; 4,302,566; 4,543,399; 4,882,400; 5,352,749; 5,541,270; 7,122,607, and 7,300,987. These patents disclose gas-phase polymerization processes where the polymerization medium is either mechanically agitated or fluidized by the continuous flow of gaseous monomer and diluent.

The "traditional" gas-phase fluidized-bed reactors described in many of the patents listed above is a simple and cost-competitive device useful for the manufacture of polyolefins. One example of a prior art polymerization process is illustrated in FIG. 1 (prior art). A catalyst is fed through supply line 2 into a fluidized bed reactor 4 and, simultaneously, a gaseous olefin is caused to pass through recycle line 6 and dispersed into the bottom of the fluidized bed reactor 4 through a gas distributor plate 8. The gas distributor plate 8 may include, for example, a perforated plate having a plurality of through holes, and is arranged in the vicinity of the bottom of the fluidized bed reactor 4. In this way, a fluidized bed 10 is formed and held in the fluidized state in the fluidized bed reactor 4. Polymerization of the monomer is carried out in the fluidized bed 10, and polymer particles produced by the polymerization reaction are continuously discharged through line 12. Unreacted gaseous olefin having passed through the fluidized bed 10 has its flow rate reduced in a velocity reduction zone 14 provided in an upper part of the fluidized bed reactor 4, where the vapor velocity is reduced so as to avoid or reduce entrainment of polymer particles from fluidized bed 10. The unreacted monomer is discharged outside the fluidized bed reactor 4 through gas outlet 16 to gas recirculation line 18 disposed at a top of velocity reduction zone 14. The unreacted gaseous olefin is then recycled via line 18 to the bottom of fluidized bed reactor 4 via compressor 20. Monomer added via line 24 accounts for monomer reacted to form the polymer removed via flow line 12 together with a small amount of dissolved monomer, thus maintaining a constant supply of monomer to reactor 4. The heat of polymerization generated in fluid bed 10 may be removed from the system by cooling the recycle gas in heat exchanger 22, which may be located upstream or downstream of compressor 20.

The active, growing powder in a fluidized bed polyolefin reactor, such as that described in FIG. 1 and the aforementioned patents, contains a wide range of particle sizes. Thus, the powder is referred to as having a broad particle size distribution. Some of the reasons for the broad size distribution are the size range of the initial catalyst particles (or prepolymer particles) charged to the reactor, the difference in catalytic activity of each catalyst particle, the difference in residence time for each growing polymer particle, the agglomeration of polymer particles, and the spalling of polymer particles.

While the above-described gas-phase reactor is extremely useful for performing polymerization reactions, many desired polyolefin products are difficult to produce in such gas-phase reactors, including bimodal and multimodal products or products having broad molecular weight distributions and other advanced products, and materials utilizing comonomers that have a higher boiling point that are normally liquids at elevated temperatures and pressures. Such products typically require the use of specialized catalysts, such as dual site or bimodal catalysts or the use of multiple reactors in series. Polymerization with such specialized catalysts often results in reactor operability issues. Additionally, traditional gas-phase reactors include various limitations on heat removal (production rate capacity), transition time between different products and catalysts, catalyst temperature rise and heat removal from a catalyst particle, and particle agglomeration due to reactor static and/or insufficient heat removal from particles resulting in softening of the produced polymer.

One attempt to overcome the deficiencies in a traditional gas-phase reactor is described in U.S. Pat. No. 5,698,642 disclosing a multi-zone circulating reactor (MZCR) in which there is an up-flowing riser section operating in a dilute-phase fast fluidization regime and a down-flowing dense-phase moving-bed section. The gas compositions in those two sections are set differently to achieve the product differentiation. WO 2006/022736 discloses a reactor system composing a plurality of MZCRs connected in fluid communication, and describes different types of operation for the different reactor zones.

With respect to the MZCR, the dense phase down-flowing moving bed may be agglomeration prone and may cause significant problem in reactor operation. Pre-polymerization is required for the MZCR, although it can not solve all the agglomeration-related reactor-operation problems. For example, see P. Cai, I. D. Burdett, "Polymerization Simulation Under Different Fluidization Regimes," Circulating Fluidized Bed Technology VIII, ed. by K. Cen, p. 410-417, International Academic Publishers (2005). In addition, it is very difficult to control the temperature uniformity in the down-flowing moving bed, which in turn can result in a negative impact on product property control.

Additional limitations of traditional gas-phase reactors can include limitations on reactor operability, range of polymers that may be produced, turndown capacity, particle sintering and throughput (polymer production rate), among other limitations.

SUMMARY

Disclosed herein is a process for the polymerization of olefins, comprising: feeding a catalyst, a liquid diluent, and an olefin to a polymerization vessel having, from a polymerization vessel bottom to a polymerization vessel top, a vapor introduction zone, a three-phase reaction zone and a vapor disengagement zone; contacting the catalyst and olefin under conditions of temperature and pressure in the presence of the liquid diluent as a continuous phase in the three-phase reaction zone to form a solid phase polyolefin; withdrawing a gas phase composition from an outlet in fluid communication with the vapor disengagement zone; circulating the gas phase composition through a gas circulation loop to an inlet in fluid communication with the vapor introduction zone at a rate sufficient to agitate the solid and liquid phases within the three-phase reaction zone; and withdrawing a reaction mixture comprising polyolefin and diluents from the three-phase reaction zone.

Also disclosed herein is a process for the polymerization of olefins, comprising: feeding a catalyst, a liquid diluent, and an olefin to a polymerization vessel having, from a polymerization vessel bottom to a polymerization vessel top, a vapor introduction zone, a three-phase reaction zone and a vapor disengagement zone; contacting the catalyst and olefin under conditions of temperature and pressure in the presence of the liquid diluent as a continuous phase in the three-phase reaction zone to form a solid phase polyolefin; withdrawing a gas phase composition from an outlet in fluid communication with the vapor disengagement zone; reducing a temperature of the circulating gas phase composition via indirect heat exchange in an overheads condenser system to condense at least a portion of the diluents in an overheads condenser; recycling at least a portion of the condensed diluents to the three-phase reaction zone; circulating the uncondensed gas phase composition to an inlet in fluid communication with the vapor introduction zone at a rate sufficient to agitate the solid and liquid phases within the three-phase reaction zone; withdrawing a reaction mixture comprising polyolefin and diluents from the three-phase reaction zone; separating the withdrawn reaction mixture into a diluents liquid phase fraction and a polyolefin fraction; and recycling at least a portion of the diluents liquid phase fraction to at least one of the three-phase reaction zone and the overheads condenser system.

Also disclosed herein is a continuous three-phase polymerization reaction system, comprising: a polymerization vessel having, from a polymerization vessel bottom to a polymerization vessel top, a vapor introduction zone, a three-phase reaction zone and a vapor disengagement zone; a gas circulation loop for circulating a gas phase composition from an outlet in fluid communication with the vapor disengagement zone to an inlet in fluid communication with the vapor introduction zone at a rate sufficient to agitate the solid and liquid phases within the three-phase reaction zone; a fluid inlet for introducing a polymerization catalyst to the three-phase reaction zone; a fluid inlet for introducing an olefin to the reactor to form a solid phase polyolefin via contact with the polymerization catalyst; a fluid outlet for withdrawing a reaction mixture comprising polyolefin and diluents from the three-phase reaction zone.

Also disclosed herein is a continuous three-phase polymerization reaction system, comprising: a polymerization vessel having a top and a bottom and comprising a three-phase reaction zone and a vapor disengagement zone in an uppermost portion of the vessel; a fluid conduit for introducing a polymerization catalyst to the three-phase reaction zone; a fluid conduit for introducing an olefin to the reactor to form a solid phase polyolefin via contact with the polymerization catalyst; a gas circulation loop for circulating a gas phase composition comprising diluents and olefin from an outlet proximate the top to an inlet proximate the bottom at a rate sufficient to agitate the solid and vapor phases within the three-phase reaction zone; an overheads condenser system for reducing a temperature of the circulating gas phase composition via indirect heat exchange to condense at least a portion of the diluents; a fluid conduit for recycling at least a portion of the condensed diluents to the three-phase reaction zone; a circulating device for transporting at least a portion of the gas phase composition through the gas circulation loop; at least one heat exchange device for decreasing a temperature of the uncondensed portion of the circulating gas phase composition; a fluid conduit for withdrawing a reaction mixture comprising polyolefin and diluents from the three-phase reaction zone; a separator for separating the recovered reaction mixture into a diluents fraction and a polyolefin fraction; and a fluid conduit for recycling at least a portion of the diluents fraction to at least one of the three-phase reaction zone and the overheads condenser system.

DETAILED DESCRIPTION

Figure 1:
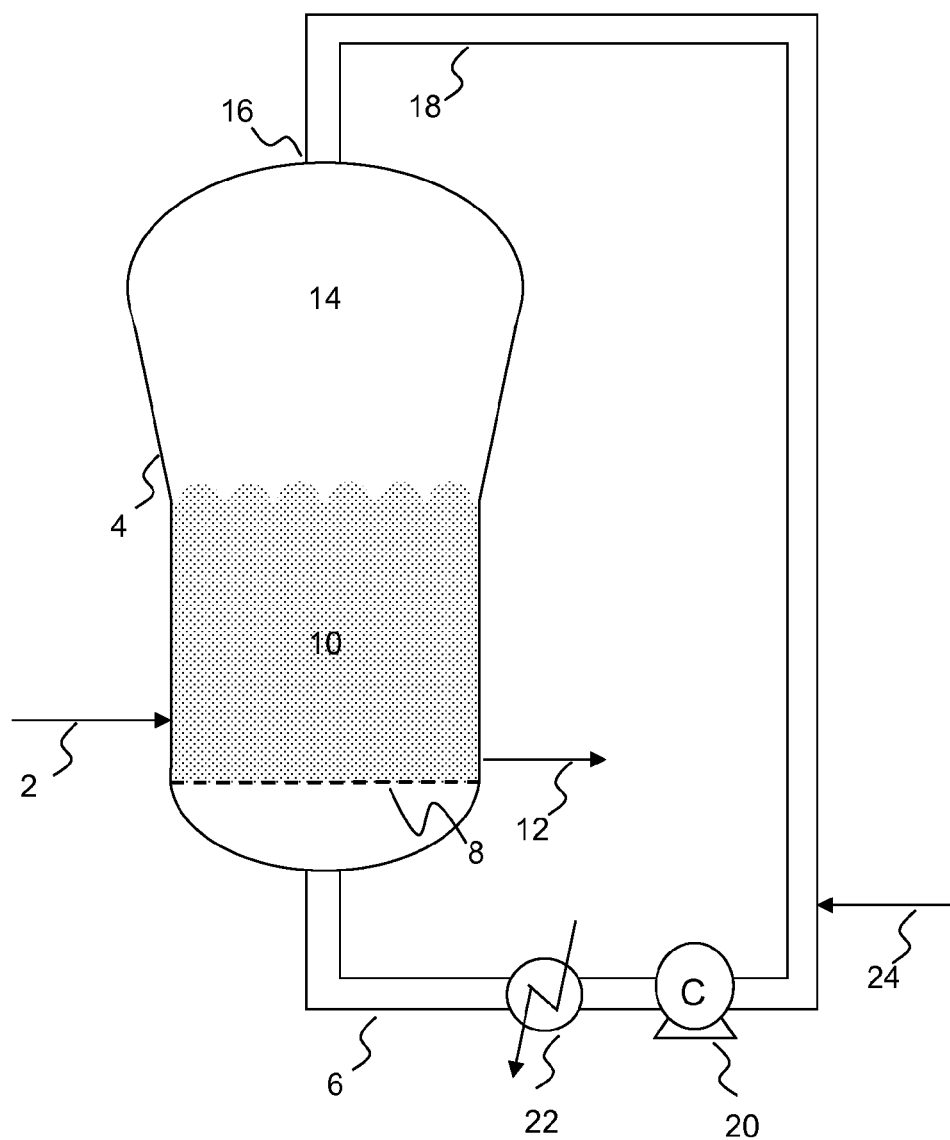
FIG. 1 is an illustrative flow diagram of a typical prior art polymerization process.

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Disclosed herein are three-phase polymerization reaction systems. More specifically, embodiments disclosed herein relate to three-phase polymerization reactor system useful for the production of polyolefins, such as polyethylenes and polypropylenes.

Three-phase polymerization reactor systems according to embodiments disclosed herein may include a three-phase polymerization reaction vessel. The three-phase polymerization reaction vessel may include a top and a bottom, intermediate of which are, from bottom to top, a vapor introduction zone, a three-phase reaction zone, and a vapor disengagement zone. The three phases present in the three-phase reaction zone includes solids (catalyst and polymer), liquid diluent and reactants, and vapor diluent and reactants.

The polymerization reaction occurs in the three phase reaction zone in a liquid-continuous medium. The liquid medium, or diluent, may be an inert hydrocarbon (i.e., not participating in the polymerization reaction), such as a C4 to C10 linear, branched, or cyclic hydrocarbon, or mixtures thereof in some embodiments, and C4 to C8 or C4 to C6 linear, branched, or cyclic hydrocarbon, or mixtures thereof in other embodiments. Polymerization catalyst, as well as liquid phase reactants such as co-monomers, co-catalysts, diene cross-linking agents, and other additives, may be introduced to the reactor, directly or indirectly, into the three-phase reaction zone.

Vapor phase reactants, such as ethylene, propylene, hydrogen, and comonomers, are introduced proximate to the bottom of the reactor. Optionally, or if necessary to achieve the desired vapor circulation rates, inert vapors, such as nitrogen, may also be circulated through the reactor. The flow of the vapor phase reactants is distributed and introduced to the three-phase reaction zone.

Distribution of the vapors may be performed using various types of gas and liquid distributors known in the art, such as a float cap, for example. Preferably, the distributor may provide for one or more of: a) maintenance of liquids above the plate without excessive weeping, b) prevention of fouling; c) suitability for situations such as power outages, start-ups and shut-downs, d) achievement of the desired gas distribution (uniformity, initial bubble size, etc.), and e) support the 3-phase bed.

The vapor flow is fed, dispersed, and/or sparged at the bottom of the reactor, creating a strong liquid recirculation. The vapor phase reactants form bubbles that traverse upward through the liquid-continuous medium, providing for a) agitation of the liquid-continuous medium, inclusive of the catalyst contained therein, and b) contact of the reactants with the polymerization catalysts to thereby form the desired solid phase polyolefins.

Slurry (liquid diluent and polymer particles) may be continuously or intermittently withdrawn from the reactor via an outlet from the three-phase reaction zone. The withdrawn mixture may then be separated to recover a polymer fraction and a diluent fraction, such as via flash separations, centrifugation, filtration, and hydrocyclone separations, among other methods. The diluent fraction may be recycled to the reactor, if desired. The polymer fraction may be further purified, if necessary, and forwarded for polymer finishing or other downstream processing.

Operating conditions within the three-phase reactor may be maintained at, near, or below a boiling point of the liquid diluent. The heat generated by the polymerization reaction may thus result in evaporation of a portion of the liquid diluent. Unreacted vapor reactants and evaporated diluent may be withdrawn from an upper portion of the reactor, where the vapor disengagement zone (between the liquid diluent and the vapor outlet) may provide for de-entrainment of liquids and solids from the vapor traffic. The reactor disengagement zone may also include equipment for removal to entrained liquid droplets such as a demister.

The unreacted vapor reactants and the evaporated diluent may then be cooled to condense at least a portion of the evaporated diluent. The condensed diluent may then returned to the three-phase reactor, and the unreacted vapor reactants may be combined with fresh reactants and recirculated back to the reactor vapor inlet.

As described above, the three-phase reaction zone is not mechanically agitated, and may include vapor bubbles, liquid bubbles (liquid-rich pockets), and solids (polymer and catalyst). The vapor phase reactants are circulated (bubbled) through the reactor at a rate sufficient to achieve a relatively uniform slurry concentration (solid bed density) throughout the entire height of the liquid-continuous reaction zone, and to circulate the solid and liquid components (i.e., the catalyst/polymer particles and liquid diluent) such that the residence time distribution of the components within the reactor are similar to that of a continuously stirred tank reactor (CSTR).

Temperature within the three-phase reaction zone is maintained via the above-mentioned agitation, avoiding hot spots, as well as via specific heat (energy differential between component inlet temperatures and the temperature of the three-phase reaction zone without a phase change) and latent heat (evaporation of the liquid diluent within the three-phase reaction zone). For example, when operating below a boiling point of the liquid diluent, to maintain isothermal polymerization conditions the heat of polymerization may be balanced against the specific heats of the feed components, such as the circulating gas composition, recycled diluent recovered from either or both the vapor circulation system or the polymer recovery system, fresh/makeup diluent, as well as fresh catalyst, monomer, and comonomer feeds, among others. It is noted that some evaporation of the diluent into the circulating gas composition may also occur, even when operating below the boiling point of the solvent, contributing to the heat balance required to maintain isothermal reaction conditions.

As another example, by maintaining the reactor operating conditions at or near a boiling point of the liquid diluent, the heat of polymerization or a portion thereof results in evaporation of the liquid diluent. In this manner, isothermal or substantially isothermal conditions may be maintained throughout the three-phase reaction zone. In addition to the latent heat removed via evaporation of the liquid diluent, feed of fresh and recirculating components to the reactor at temperatures less than the operating temperature of the three-phase reaction zone provides additional heat removal. For example, condensing, subcooling, and returning the evaporated diluent to the three-phase reaction zone, as well as cooling of the vapor reactants circulating from the reactor vapor outlet to the reactor vapor inlet, may provide additional means for temperature control of the three-phase reaction zone. Alternatively or in addition to the above, a heat exchange device may also be provided to remove heat via indirect heat exchange with one or more portions of the polymerization reactor, such as with the three-phase reaction zone. Table 1 shows calculated values for a heat balance for a three-phase reactor according to embodiments disclosed herein, illustrating the latent and specific heat for removal of the heat of polymerization when isobutane is used as inert diluent during the production of polyethylene

TABLE 1

| | | |
|---|---|---|
| Unit Capacity | KTA | 500 |
| Reactor Temperature | ° C. | 90 |
| Production rate | Lb/hr | 1.38E+05 |
| Heat of Reaction | Btu/hr | 2.02E+08 |
| Superficial gas velocity | ft/s | 1.2 |
| Reactor diameter | ft | 16 |
| Recycle gas flow | lb/hr | 1.56E+06 |
| Gas inlet temperature | ° C. | 40 |
| Heat Removal by recycle gas | Btu/hr | 6.96E+07 |
| Required Isobutane (iC4) evaporation rate | lb/hr | 7.87E+05 |
| Actual heat removed by evaporation | Btu/hr | 7.83E+07 |
| Equivalent Condensing wt % | | 33.5 |
| Reactor temperature | C. | 90 |
| Temperature (after condenser) | C. | 40 |
| Heat removal by returned iC4 | Btu/hr | 5.42E+07 |
| Overall Heat removal via isobutane | Btu/Hr | 1.33E+08 |
| Total Bed Weight (liquid + polymer) | Lb | 446,131 |
| Polymer weight (30% solid) | Lb | 133,839 |
| Residence Time | Hr | 1 |

The three-phase polymerization reactors according to embodiments disclosed herein may be used as a single-reactor system, or may be part of a multi-reactor system. Multi-reactor systems according to embodiments disclosed herein may include two or more three-phase polymerization reactors in series or in parallel, and may also include one or more three-phase polymerization reactors in series or in parallel with a second polymerization reactor, such as a gas-phase reactor, a slurry loop reactor, a mechanically stirred tank reactor (such as liquid pool processes), and a solution reactor. Reactors and reactor systems according to embodiments disclosed herein may be used to produce a wide variety of polyolefins, including homopolymers and copolymers, monomodal and bi- or multi-modal polymers. Stacked reactors in a single vessel are also contemplated to achieve a multi-reactor configuration.

Figure 2:
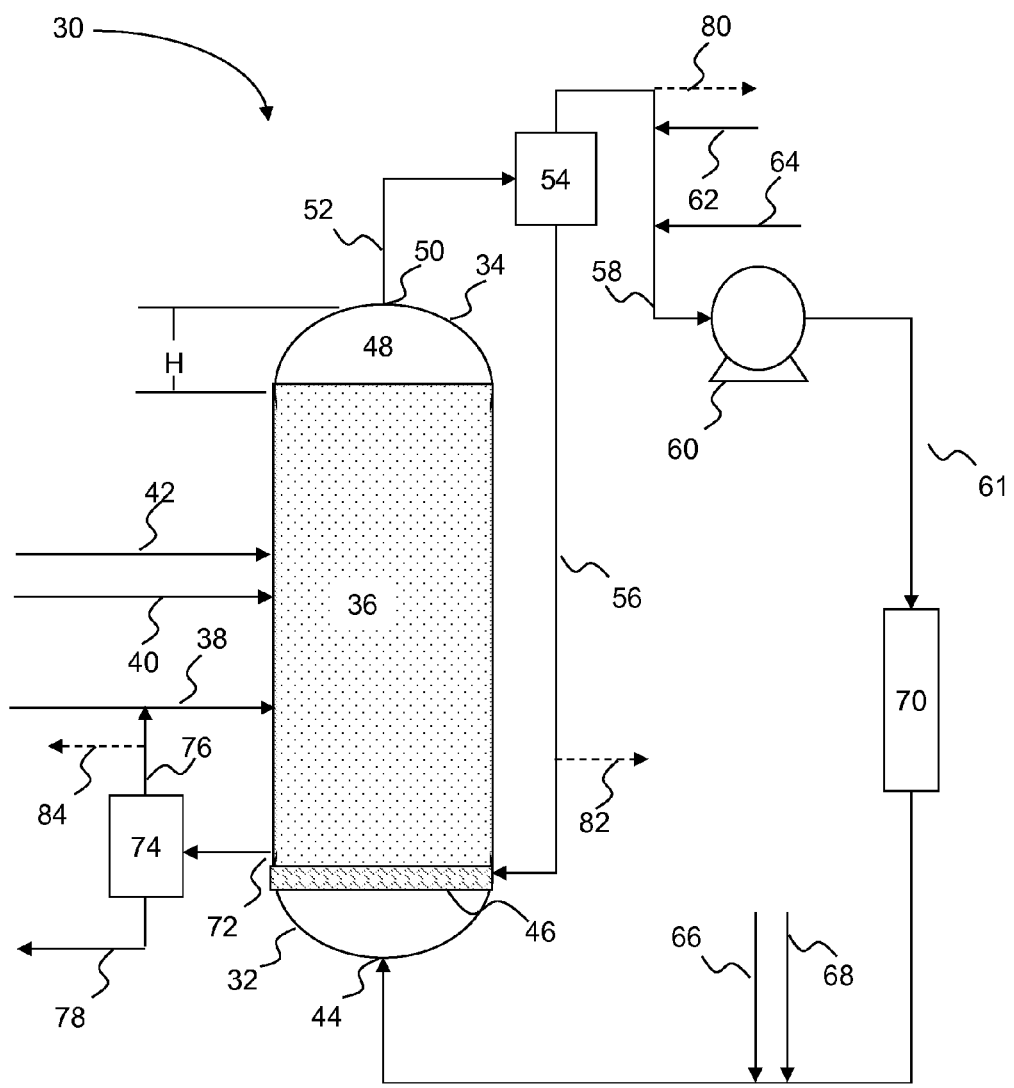
FIG. 2 is an illustrative flow diagram of a three-phase polymerization reactor.

One embodiment of a reactor system for use in polymerization processes disclosed herein is illustrated in FIG. 2. The reactor system includes a three-phase reactor 30 having a bottom portion 32, a top portion 34, and a three-phase reaction zone 36 that contains a liquid-continuous slurry of catalyst and polymer particles in a liquid diluent which are agitated via circulation (bubbling) of a vapor phase, including polymerization reactants, through the liquid-continuous slurry. Liquid diluent, catalyst, co-catalysts, monomer(s), comonomer(s), inert gas(es), activator(s), polymerization modifier(s), antistatic agent(s), chain terminating agent(s) and other gas, liquid or solid phase components commonly used in the polymerization of olefins may be introduced to three-phase reaction zone 36 via one or more flow lines 38, 40, and 42, respectively.

Circulating vapor phase reactants are fed to reactor 30 via a vapor inlet 44 disposed on bottom portion 32. The vapor phase reactants are then distributed via distributor 46 (vapor introduction zone) into the liquid-continuous slurry to provide the desired agitation and contact of the reactants with the catalyst for the production of polymer.

The vapors are bubbled upward through the three-phase reaction zone, are accumulated in a vapor disengagement zone 48 proximate the top portion 34. The heat of polymerization may also result in the evaporation of a portion of the liquid diluent. Unreacted vapors and evaporated diluent, and possibly entrained liquids or solids, are continuously withdrawn from reactor 30 via vapor outlet 50. In some embodiments, vapor disengagement zone 48 may have a height "H" sufficient to allow for the deentrainment of liquid and solid components from the vapors withdrawn. In alternative embodiments, a deentrainment device (not shown) may be located proximate outlet 50 to capture and return entrained components to the three-phase reaction zone 36.

Vapors withdrawn from reactor 30 through outlet 50 may be transported via flow line 52 to overhead condenser system 54. Overhead condenser system 54 may include one or more heat exchangers (not shown) for removing heat from the withdrawn vapors. Overhead condenser system 54 may also include one or more accumulators, demisters, and pumps (each not shown) for separation of uncondensed vapors and condensed liquids.

Condensed liquid diluent may then be recycled via flow line 56 to the three-phase reaction zone. The recycled liquid diluent may be returned to reactor 30 and introduced to the three-phase reaction zone 36 at the distributor 46 or any point above the distributor 46. For example, in some embodiments, it may be desired to recycle the condensed liquid diluent to a bottom portion of the three-phase reaction zone 36, as illustrated. In other embodiments, it may be desired to introduce the recycled liquid diluent to one or more locations on top portion 34, providing for washing of the reactor dome and/or walls above the vapor/liquid interface, thus avoiding or minimizing the accumulation of polymer in the vapor space at the top of the reactor 30.

Uncondensed vapor may be forwarded via flow line 58 from overhead condenser system 54 to compressor 60 for circulation of the vapor back to reactor 30 vapor inlet 44 via flow line 61. Due to consumption during the polymerization reaction, fresh or make-up vapor phase reactants (one or more of monomer(s), comonomer(s), inert gas(es), chain terminating agent(s), and other compounds commonly used in the polymerization of polyolefins) may be introduced to the vapor circulation loop upstream or downstream of compressor 60, such as via one or more flow lines 62, 64, 66, and 68.

The heat of polymerization is removed from three-phase reaction zone by the heat of evaporation of the liquid diluent, as mentioned above, as well as by the specific heat to bring the vapor feed and the recycled vapor and condensed liquids up to reaction temperature. As such, temperature within reactor 30 may be controlled via manipulation of reactor pressure (thus affecting diluent evaporation rates), overhead condenser system condensate temperature (affecting specific heat attributed to recycled condensed diluent), and vapor inlet temperatures (affecting specific heat attributed to the circulating gas composition). If necessary, one or more heat exchangers may be used to further cool the condensate in line 56 or the vapors circulating in line 62 to provide additional heat removal from the three-phase reaction zone. As illustrated in FIG. 2, a heat exchanger 70 is provided to reduce the temperature of the gas composition being returned to reactor 30.

Polymer product may be recovered from three-phase reaction zone 36 via outlet 72. Liquid diluent and polymer particles, and possibly entrained vapors, may be continuously or intermittently withdrawn from three-phase reaction zone 36 and forwarded to polymer recovery system 74 for separation of the mixture into a polymer fraction and a liquid diluent fraction. Polymer recovery system 74 may include one or more separation devices for separating liquids and solids, including filters, settling tanks, flash vessels, dryers, centrifuges, and hydrocyclones, among others. The liquid diluent fraction, together with any co-existing gas that may be present, may be recycled via flow line 76 to three-phase reaction zone 36. The polymer fraction may be forwarded via flow line 78 for further processing (drying, additive blending, pelletization, formation into end products, etc.).

One or more purge streams may be used to avoid build-up of unwanted liquid or vapor components in the reaction system, such as light and/or heavy reaction by-products, feed impurities, etc. For example, purge stream 80 may provide for removal of light components (nitrogen, ethane, propane, butanes, etc.) and purge streams 82, 84 may provide for removal of heavier, condensable components.

Figure 3:
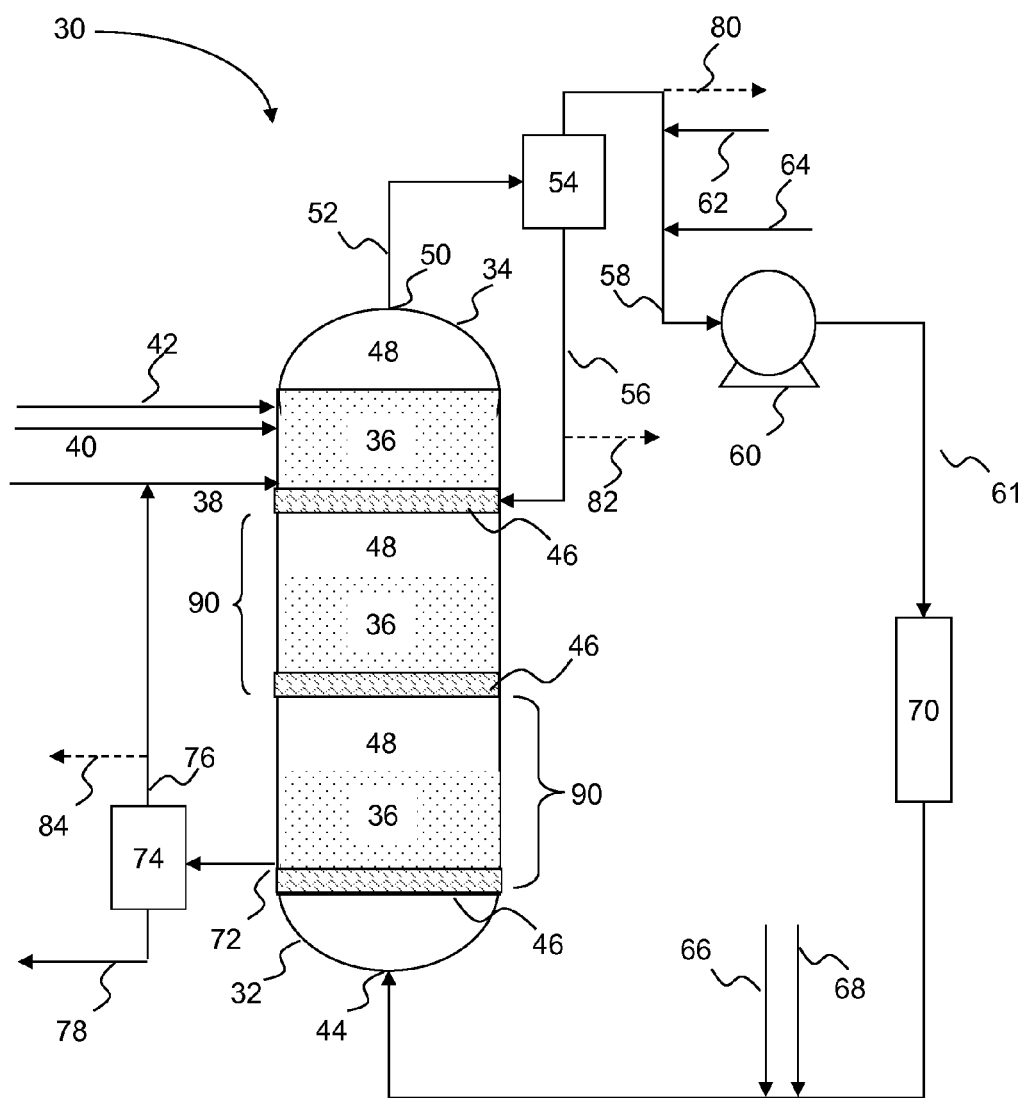
FIG. 3 is an illustrative flow diagram of a multi-stage three-phase polymerization reactor.
Figure 4:
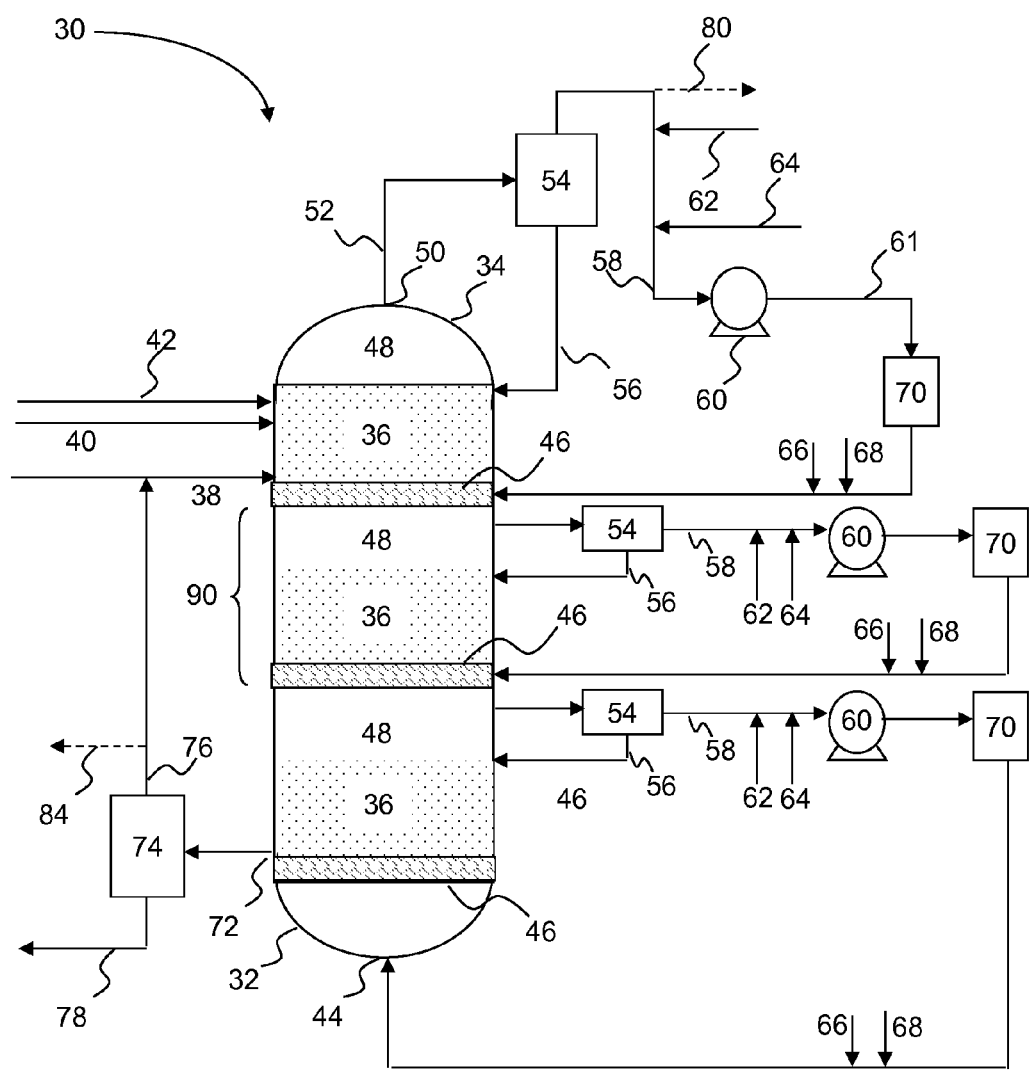
FIG. 4 is an illustrative flow diagram of a multi-stage three-phase polymerization reactor.

Referring now to FIGS. 3 and 4, simplified flow diagrams of multi-stage three-phase polymerization reactors according to embodiments disclosed herein are illustrated, where like numerals represent like parts. The embodiment illustrated by FIG. 3 has a common gas phase circulation system, while the embodiment illustrated by FIG. 4 has individual gas phase circulation systems.

Reactor 30 may include two or more reaction stages 90, each comprising a three phase reaction zone 36, a vapor introduction zone 46, and a vapor disengagement zone 48. In other words, each of the two or more three phase reaction zones 36 is in fluid communication with an associated vapor introduction zone 46 and an associated vapor disengagement zone 48, where each reaction stage operates similar to a continuous stirred tank reactor with regard to solid and liquid phase residence time distributions. The liquid diluent and catalyst are fed to an uppermost reaction stage 90. Slurry may then be withdrawn from each three-phase reaction zone 36 and transported downward through the column, such as via downcomers or other fluid transport devices, piping, pumps, and other level control equipment (not shown).

Referring now to FIG. 3, the gas phase is withdrawn from an uppermost vapor disengagement zone 48 and circulated via the gas circulation loop to a bottommost vapor introduction zone 46. Vapor withdrawn from the lowermost vapor disengagement zone may then be distributed via the above vapor introduction zone, and the gas phase flow proceeds in a like manner to the uppermost vapor disengagement zone. Slurry withdrawn from the bottommost three-phase reaction zone 36 is then fed to polymer recovery system 74 for separation of diluent from the polymer product. The vapor phase recirculation rate may be sufficient to agitate solids and liquids in each three-phase reaction zone 36. Use of multiple reaction zones 90, for example, may provide a benefit of vapor redistribution, maintaining the gas phase bubbles within a desired range for the bubble size. The redistribution of vapors may provide for enhanced transport of the vapor phase monomer to the liquid phase, and consistent mixing over the combined height of the reactor, among other benefits. Additionally, liquid phase comonomers may be added to lower reaction zones if desired.

Referring now to FIG. 4, each of the multiple reaction zones 90 may include an associated gas circulation loop. In this manner, the multiple reaction zones may be operated at the same or different temperatures, with the same or different gas composition, with the same or different monomer or comonomer compositions, and additional or different catalysts may be injected into the numerous reaction zones, among other ways to make multi-modal or other desirable polymer products in a single reaction vessel.

As described above, three-phase polymerization reactor systems according to embodiments disclosed herein may be useful for the polymerization of various monomers and comonomers. Additionally, polymerization catalysts, co-catalysts, activators, solvents, and other polymerization modifiers or aids may be used for polymerization processes conducted in three-phase polymerization reactor systems described herein. Each of these will be discussed in more detail below.

Processes and apparatus disclosed herein may be useful, for example for the polymerization of one or more olefin monomers having from 2 to 30 carbon atoms; olefins having from 2 to 12 carbon atoms in other embodiments; and olefins having from 2 to 8 carbon atoms in yet other embodiments. The reactors and processes disclosed herein are particularly suited to the polymerization of one or more olefin monomers, such as ethylene, propylene, butene-1, pentene-1,4-methyl-pentene-1,3-methyl-pentene-1, hexene-1, octene-1,3,5,5-tri-methyl-hexene-1, and decene-1.

Other monomers that may be useful in various embodiments disclosed herein may include ethylenically unsaturated monomers, diolefins having 4 to 18 carbon atoms, conjugated or non-conjugated dienes, polyenes, vinyl monomers, and cyclic olefins. Non-limiting examples of such monomers may include norbornene, norbornadiene, isobutylene, isoprene, vinylbenzocyclobutane, styrenes, alkyl substituted styrene, ethylidene norbornene, dicyclopentadiene, and cyclopentene. For example, co-monomers may include those dienes disclosed in U.S. Pat. No. 5,317,036, such as hexadiene, dicyclopentadiene, norbornadiene, and ethylidene norbornene; and readily condensable monomers such as those disclosed in U.S. Pat. No. 5,453,471 including isoprene, styrene, butadiene, isobutylene, and chloroprene, acrylonitrile, and the like.

In a family of embodiments, ethylene-based polymers may be prepared by processes disclosed herein. Such ethylene-based polymers may include homopolymers of ethylene and interpolymers of ethylene and at least one alpha-olefin wherein the ethylene content is at least about 50% by weight of the total monomers involved. Comonomers that may be used may include propylene, 1-butene, 1-pentene, 1-hexene, 1-heptene, 1-octene, 4-methylpentene-1,1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. Useful comonomers may also include polymerizable macromers, such as a vinyl terminated polymer or oligomer. When olefins are formed in situ in the polymerization medium, the formation of polyolefins containing long chain branching may occur. In one embodiment, the content of the alpha-olefin comonomer incorporated into an ethylene-based polymer may be no greater than 49 mol % in total; from 3 to 35 mol % in other embodiments.

In another family of embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1,1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. Useful comonomers may also include polymerizable macromers, such as a vinyl terminated polymer or oligomer. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total; from 3 to 35 mol % in other embodiments.

Any type of polymerization catalyst may be used in the present processes, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium based catalysts, such as those described in U.S. Pat. Nos. 3,709,853; 3,709,954; and 4,077,904.

C. Vanadium based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.
E. Cationic forms of metal halides, such as aluminum trihalides.
F. Cobalt catalysts and mixtures thereof, such as those described in U.S. Pat. Nos. 4,472,559 and 4,182,814.
G. Nickel catalysts and mixtures thereof, such as those described in U.S. Pat. Nos. 4,155,880 and 4,102,817.
H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.
I. Group 15 atom and metal containing catalysts described in, for example, EP 0 893 454 A1, U.S. Pat. No. 5,889,128 and the references cited in U.S. Pat. No. 5,889,128.
J. Gibson iron based catalyst systems.
K. Any combination of the above to form a mixed catalyst system.

The catalyst compounds, activators and/or catalyst systems, as noted above, may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Support materials may include inorganic or organic support materials, such as a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The support materials may include inorganic oxides including Group 2, 3, 4, 5, 13 or 14 metal oxides, such as silica, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184. Other support materials include nanocomposites, as described in PCT WO 99/47598, aerogels, as described in WO 99/48605, spherulites, as described in U.S. Pat. No. 5,972,510, and polymeric beads, as described in WO 99/50311.

Support material, such as inorganic oxides, may have a surface area in the range from about 10 to about 700 $m^2/g$, a pore volume in the range from about 0.1 to about 4 cc/g, and an average particle size in the range from about 1 to about 1000 µm. In other embodiments, the surface area of the support may be in the range from about 50 to about 500 $m^2/g$, the pore volume is from about 0.5 to about 3.5 cc/g, and the average particle size is from about 10 to about 500 µm. In yet other embodiments, the surface area of the support is in the range from about 100 to about 1000 $m^2/g$, the pore volume is from about 0.8 to about 5.0 cc/g, and the average particle size is from about 5 to about 200 µm. The average pore size of the support material in some embodiments disclosed herein is in the range from 10 to 1000 Å; from about 50 to about 500 Å in other embodiments; and from about 75 to about 450 Å in yet other embodiments.

There are various methods known in the art for producing a supported activator or combining an activator with a support material. In an embodiment, the support material is chemically treated and/or dehydrated prior to combining with the catalyst compound, activator and/or catalyst system. In a family of embodiments, the support material may have various levels of dehydration, such as may be achieved by drying the support material at temperatures in the range from about 200° C. to about 1000° C. These supports may also be chemically dehydrated using water reactive compounds such as silane and organoaluminum compounds.

In some embodiments, dehydrated silica may be contacted with an organoaluminum or alumoxane compound. In specifically the embodiment wherein an organoaluminum compound is used, the activator is formed in situ in the support material as a result of the reaction of, for example, trimethylaluminum and water.

In yet other embodiments, Lewis base-containing support substrates will react with a Lewis acidic activator to form a support bonded Lewis acid compound. The Lewis base hydroxyl groups of silica are exemplary of metal/metalloid oxides where this method of bonding to a support occurs. These embodiments are described in, for example, U.S. Pat. No. 6,147,173.

Other embodiments of supporting an activator are described in U.S. Pat. No. 5,427,991, where supported non-coordinating anions derived from trisperfluorophenyl boron are described; U.S. Pat. No. 5,643,847, discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603-1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In some embodiments, the supported activator is formed by preparing, in an agitated, temperature and pressure controlled vessel, a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range from about 10 weight percent to about 70 weight percent, in the range from about 20 weight percent to about 60 weight percent in other embodiments, in the range from about 30 weight percent to about 50 weight percent in other embodiments, and in the range from about 30 weight percent to about 40 weight percent in yet other embodiments.

Conventional supported catalysts system useful in embodiments disclosed herein include those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895, 5,939,348, 546,872, 6,090,740 and PCT publications WO 95/32995, WO 95/14044, WO 96/06187 and WO 97/02297, and EP-B1-0 685 494.

The catalyst components, for example a catalyst compound, activator and support, may be fed into the polymerization reactor as a mineral oil slurry or as a slurry in liquid diluent. Solids concentrations in the mineral oil or liquid diluent may range from about 3 to about 30 weight percent in some embodiments; and from about 10 to about 25 weight percent in other embodiments.

The catalyst compounds, activators and or optional supports used herein may also be spray dried separately or together prior to being injected into the reactor. The spray dried catalyst may be used as a powder or solid or may be placed in a diluent and slurried into the reactor. In other embodiments, the catalyst compounds and activators used herein are not supported.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the three-phase reaction zone separately or independently from the liquid catalyst if they are solids, or as part of the catalyst provided they do not interfere with the desired catalyst distribution. To be part of the catalyst solution, the additives should be liquids or capable of being dissolved in the catalyst solution. Oxidative stabilizers, such as phenolic and phosphite substituted compounds, including IRGANOX 1076 and IRGAFOS 168 for example, may also be used.

As used herein, a static control agent is a chemical composition which, when introduced into a fluidized reactor, may influence or drive the static charge (negatively, positively, or to zero) in the fluidized bed. Although polymerization is conducted in a liquid medium as disclosed herein, the fluidized solids may require static dissipation. Additionally, static control agents may aid in controlling deposition and build-up of any solids that may be entrained into the vapor circulation system.

The specific static control agent used may depend upon the nature of the static charge, and the choice of static control agent may vary dependent upon the polymer being produced and the catalyst being used. For example, the use of static control agents is disclosed in European Patent No. 0229368 and U.S. Pat. No. 5,283,278 and references cited therein.

For example, if the static charge is negative, then static control agents such as positive charge generating compounds may be used. Positive charge generating compounds may include MgO, ZnO, $Al_2O_3$, and CuO, for example. In addition, alcohols, oxygen, and nitric oxide may also be used to control negative static charges. See, for example, U.S. Pat. Nos. 4,803,251 and 4,555,370.

For positive static charges, negative charge generating inorganic chemicals such as $V_2O_5$, $SiO_2$, $TiO_2$, and $Fe_2O_3$ may be used. In addition, water or ketones containing up to 7 carbon atoms may be used to reduce a positive charge.

In a class of embodiments, when catalysts such as, for example, metallocene catalysts, are used in the three-phase polymerization reactors disclosed herein, control agents such as aluminum stearate may also be employed. The static control agent used may be selected for its ability to receive the static charge in the fluidized bed without adversely affecting productivity. Suitable static control agents may also include aluminum distearate, ethoxlated amines, and antistatic compositions such as those provided by Innospec Inc. under the trade name OCTASTAT 2000, a mixture of a polysulfone copolymer, polymeric polyamine, and oil-soluble sulfonic acid. Other control agents may include LUPASOL FG, a low molecular weight (800 Daltons) ethylenimine copolymer, and LUPASOL WF, a medium molecular weight (25000 Daltons) ethylenimine copolymer, each available from BASF Any of the aforementioned control agents, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE (available from Crompton Corporation) or ATMER (available from ICI Americas Inc.) family of products).

Other static control agents useful in embodiments disclosed herein are well known to those in the art. Regardless of which agent is used, care should be exercised in selecting an appropriate static control agent to avoid introduction of poisons into the reactor. In addition, in selected embodiments, the smallest amount of the agent necessary to bring the static charge into alignment with the desired range should be used.

In some embodiments, the static control agent added to the reactor may be a combination of two or more of the above listed static control agents. In other embodiments, the static control agent(s) may be added to the reactor in the form of a solution or a slurry, and may be added to the reactor as an individual feed stream or may be combined with other feeds prior to addition to the reactor. For example, the static control agent may be combined with the catalyst or catalyst slurry prior to feeding the combined catalyst-static control agent mixture to the reactor.

In some embodiments, the static control agent may be added to the reactor in an amount ranging from 0.05 to 200 ppm, based on the weight of all feeds to the reactor, excluding recycle. In other embodiments, the static control agent may be added to the reactor in an amount ranging from 2 to 100 ppm; and from 4 to 50 ppm in yet other embodiments. In other embodiments, the static control agent may be added to the reactor in an amount of 4 ppm or greater, based on the weight of all feeds to the reactor, excluding recycle.

In some embodiments of the processes disclosed herein, catalyst, monomer, comonomer, inert, chain transfer agent, solvents, and other compounds discussed above may be added, individually or in various combinations, directly or indirectly, to the three-phase reaction zone.

Hydrogen gas is often used in olefin polymerizations according to embodiments disclosed herein to control the final properties of the polyolefin. Using the catalyst systems described above, it is known that increasing the concentration (partial pressure) of hydrogen decreases the molecular weight of the polymer and conversely increases the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of embodiments disclosed herein is an amount necessary to achieve the desired MFI or MI of the final polyolefin resin.

The three-phase reaction zone may be operated over a wide range of temperatures and pressures. The three-phase reaction zone may be operated at temperatures in the range from $-60°$ C. to about $280°$ C. in some embodiments; from $50°$ C. to about $200°$ C. in other embodiments. In other embodiments, the three-phase reaction zone may have a temperature ranging from about $10°$ C. to about $150°$ C.; and in another embodiment from about $40°$ C. to about $125°$ C. In one embodiment, the temperature in the three-phase reaction zone may be operated at the highest feasible temperature taking into account the sintering temperature of the polymer within the reactor and the boiling point of the liquid diluent.

The pressures used may be in the range from about 0.01 atmosphere to about 500 atmospheres or higher. In one embodiment, the three-phase reactor may be operated at pressures ranging from about 0.7 to about 70 bar (about 10 to 1000 psia); and in another embodiment a pressure ranging from about 14 to about 42 bar (about 200 to about 600 psia).

The flow rate of the gas through the three-phase reaction zone in the reactors described herein, as mentioned above, is selected to result in sufficient agitation of the reactor to circulate the solids and liquids throughout the three-phase reaction zone so as to maintain an average residence time profile similar to that of an ideal CSTR. The superficial gas velocity in the three-phase reaction zone may vary from point to point, as based on temperature, dissolution in the liquid diluent, and the location of various feeds, such as hydrogen, monomer, and comonomer feeds, among other variables. Regardless, the lowest superficial gas velocity in the three-phase reactor should be high enough to attain the desired agitation. In this manner, settling or lack of circulation of large particles within the reactor can be avoided. The superficial gas velocity in the three-phase reaction zone of the polymerization reactors disclosed herein may be greater than about 0.1 meters per second, for example. In some embodiments, superficial gas velocities may range from about 0.2 meters per second to about 3 meters per second; from about 0.2 meters per second to about 0.6 meters per second in other embodiments.

It is desired to maintain the three-phase reaction zone as liquid-continuous. Thus, the upper limit for superficial gas velocity is that which results in foaming of the reactor contents. The point where foaming occurs may depend on a number of factors, including the polymer particle size and particle size distribution, slurry solids content, the particular liquid diluent(s), and operating temperature and pressure, among other factors. The above values are given as a general reference, where one skilled in the art can readily determine the necessary superficial gas velocities required to attain the desired agitation. In some embodiments, anti-foaming agents may be used to aid in maintaining the three-phase reaction zone as liquid-continuous. Any anti-foaming agents used in embodiments disclosed herein preferably do not negatively affect the polymerization or the polymer product.

The three-phase polymerization reactors according to embodiments disclosed herein allow a wide platitude of products to be made. For example, the reactors may be operated for the production of resins having a unimodal molecular weight distribution, bimodal molecular weight distribution, narrow molecular weight distribution, broad molecular weight distribution, narrow composition distribution, broad composition distribution, etc.

Facilitating the production of the numerous products is the ability to easily change the residence time of catalyst particles within the reactor. Residence time may be manipulated by adjusting the slurry withdrawal rates, catalyst feed rates, three-phase reaction zone level (bed height), and slurry concentration. Slurry concentration within the three-phase reaction zone may be up to 55 weight % solids, based on a total weight of the liquid diluents, liquid reactants, and catalyst/polymer particles in the three-phase reaction zone. In other embodiments, the slurry concentration may be in the range from 5 wt. % to 55 wt. %; from 10 wt. % to 50 wt. % in other embodiments; from 15 wt. % to 45 wt. % in other embodiments; and from 20 wt. % to 40 wt. % in other embodiments. In other embodiments, the slurry concentration may be in the range from 25 wt. % to 35 wt. %. This will also allow for significant improvements in product transitions from one grade to the next.

The operating slurry concentration may be selected based on catalysts used, the desired polymer product, and many other factors. For example, residence times for three-phase polymerization reactors according to embodiments disclosed herein may range from 0.25 hours up to about 4 hours or more; from about 0.5 hours to 3 hours in other embodiments; and from about 0.75 hours to about 2 hours in yet other embodiments. Moderately high residence times of 1.5 to over 3 hours may be used mainly due to three reasons a) to achieve good catalyst activity, and b) control of product properties. Three-phase reactors according to embodiments disclosed herein also have the potential to operate with high activity catalysts, and thus low residence times, as the three-phase operations makes it possible to remove the heat of polymerization and due to better control of particle temperature, even for high activity catalysts.

For conventional catalysts such as those based on Cr or Ziegler-Natta catalysts, the residence time can be increased if necessary in a three-phase reaction system by lowering the production rate. To accommodate these catalysts in order to maintain high capacity, the reactor can be designed to be larger or by operating at higher solids content. As an example, for a given reactor size, it is expected that increasing solids content from about 30 wt. % to about 35 wt. % would increase residence time by about 20%.

In some embodiments, one or more olefins, including ethylene or propylene or combinations thereof, may be prepolymerized in the presence of the catalyst systems described above prior to the main polymerization within the reactors described herein. The prepolymerization may be carried out batch-wise or continuously in gas, solution, or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and WO 97/44371.

In a family of embodiments, the reactors disclosed herein are capable of producing greater than 500 lbs of polymer per hour (227 Kg/hr) to about 220,000 lbs/hr (100,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 Kg/hr) and most preferably greater than 65,000 lbs/hr (29,000 kg/hr) to greater than 100,000 lbs/hr (45,500 kg/hr).

The polymers produced by the processes described herein can be used in a wide variety of products and end-use applications. The polymers produced may include linear low density polyethylene, elastomers, plastomers, high density polyethylenes, medium density polyethylenes, polypropylene homopolymers and polypropylene copolymers, including random copolymers, and block or multi-block copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc. Density is measured in accordance with ASTM-D-1238.

In yet another embodiment, propylene based polymers are produced according to embodiments disclosed herein. These polymers include atactic polypropylene, isotactic polypropylene, hemi-isotactic and syndiotactic polypropylene. Other propylene polymers include propylene block, random, or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

The polymers may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes, and the like.

Polymers produced by the processes disclosed herein and blends thereof are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains. Therefore, the following examples are put forth so as to provide those skilled in the art with a complete disclosure and description and are not intended to limit the scope of that which the inventors regard as their invention.

The following examples are derived from modeling techniques and although the work was actually achieved, the inventors do not present these examples in the past tense to comply with M.P.E.P. §608.01(p) if so required.

Example 1

Production of LLDPE

A process similar to that illustrated in FIG. 2 is operated under continuous conditions to produce linear low density polyethylene (LLDPE, where the co-monomer is butene). The reactor dimensions are a diameter of 14 feet and a bed height of 50 feet. Operating conditions of the polymerization system are given in Table 2. Various stream compositions, with stream numbers corresponding to those of FIG. 2, are given in Table 3.

Example 2

Production of Polyethylene Homopolymer

A process similar to that illustrated in FIG. 2 is operated under continuous conditions to produce polyethylene homopolymer. The reactor dimensions are a diameter of 14 feet and a bed height of 50 feet. Operating conditions of the polymerization system are given in Table 2. Various stream compositions, with stream numbers corresponding to those of FIG. 2, are given in Table 4.

TABLE 2

| | Example | |
| --- | --- | --- |
| | 1 - LLDPE | 2 - PE Homopolymer |
| Pressure, MPa-gauge (psig) | (400) | (400) |
| Temperature, ° C. (° F.) | 90 (194) | 90 (194) |
| Liquid Diluent | Isobutane | Isobutane |
| Comonomer | 1-butene | — |
| Polymer Production Rate, kg/h (lb/h) | (138000) | (138000) |
| Superficial Gas velocity, m/s (ft/s) | (1.2) | (1.2) |

TABLE 3

| | Stream/Location | | | | | |
|---|---|---|---|---|---|---|
| | 52 | 56 | 58 | 61 | 44 | 36 |
| Description | Reactor Outlet | Liquid Recycle | Compressor Suction | Compressor Discharge | Reactor Inlet Gas | Reactor Liquid |
| Mole Fractions | | | | | | |
| Ethylene | 33% | 21% | 58% | 58% | 57% | 13% |
| 1-Butene | 11% | 13% | 6% | 6% | 6% | 15% |
| Hydrogen | 3% | 0% | 6% | 6% | 6% | 0% |
| Iso-Butane | 53% | 66% | 31% | 31% | 30% | 71% |
| Total Flow lb/hr | 2,653,480 | 1,679,530 | 1,097,860 | 1,097,860 | 1,108,620 | |
| Temperature °C. | 90 | 70 | 66.0 | 68.8 | 61.7 | 90 |
| Pressure psi | 414.7 | 414.7 | 409.7 | 429.0 | 425.1 | 414.7 |

TABLE 4

| | Stream/Location | | | | | |
|---|---|---|---|---|---|---|
| | 52 | 56 | 58 | 61 | 44 | 36 |
| Description | Reactor Outlet | Liquid Recycle | Compressor Suction | Compressor Discharge | Reactor Inlet Gas | Reactor Liquid |
| Mole Fractions | | | | | | |
| Ethylene | 26% | 16% | 48% | 48% | 48% | 10% |
| 1-Butene | 0% | 0% | 0% | 0% | 0% | 0% |
| Hydrogen | 9% | 1% | 16% | 16% | 16% | 1% |
| Iso-Butane | 65% | 83% | 36% | 36% | 36% | 89% |
| Total Flow lb/hr | 2,524,560 | 1,635,623 | 1,023,800 | 1,023,800 | 1,024,295 | |
| Temperature °C. | 90 | 68 | 64.0 | 66.7 | 58.8 | 90 |
| Pressure psi | 414.7 | 414.7 | 409.7 | 429.0 | 425.1 | 414.7 |

The heat balance for the above simulations take into account the evaporation of liquid diluent from the reactor, condensation of at least a portion of the evaporated diluent, and recycle of the condensed diluent. The simulations indicate that a condensate temperature of 68° C. to 70° C. would be sufficient, having a heat removal of approximately 206 MM Btu/h from the overhead condenser. The results above indicate that the cycle gas cooler (downstream of the cycle gas compressor) may be an optional component, depending upon the amount of cooling achievable in the overhead condenser.

For additional cases, such as where a C6 diluent is used, and thus less evaporation, a condensate temperature of about 40° C. provides sufficient cooling, and is within the bounds of temperatures generally achievable with plant cooling water. Additional cooling for operating with a C6 diluent may also be achieved by decreasing the temperature of the cycle gas fed to the reactor.

Example 3

Simulations were performed to characterize the fluidization quality in a three-phase system. The conditions listed in Table 5 were used for the simulation.

TABLE 5

| | Case | |
|---|---|---|
| | 1 | 2 |
| Diluent | Isobutane | Isobutane |
| Pressure | 400 psig | 315 psig |
| Temperature | 90 | 85 |
| Superficial Gas Velocity | 1.2 ft/s | 1.2 ft/s |
| Polymer/Catalyst type | Various | Various |
| Source of liquid and gas properties | ASPEN and DIADEM | ASPEN and DIADEM |

By the Fan Classification of 3-phase systems, the proposed 3-phase reaction system can be classified as E-III-a, i.e., slurry bubble column. The gas velocity (1.2 ft/s) is close to the upper limit of the System E-III-a, beyond which the gas will become the continuous phase and the liquid will be discrete phase. Based on the Deckwer flow-regime map, the system is in Coalesced Bubble Regime (heterogeneous) which means gas passes through the bed in the form of bubbles. For this simulation, the gas-hold up is estimated using Koide equation (J. Chem. Eng. Japan, Vol. 17, p. 459 (1984), while the solid holdup is estimated using Razumov Equation (Int. Chem. Eng., Vol. 13, p. 57 (1973)).

Foaming evaluations were conducted by comparing the liquid surface tension with that of a slurry Fischer-Tropsch (F-T) synthesis reactor which can avoid/manage severe foaming It is a conservative approach because F-T reactor has a similar gas velocity and a higher liquid velocity. F-T reactor's liquid is FT-300 paraffin wax (also called SH-105 Vestowax), with melt point of 110° C. and average MW of 730, running under 260-280° C., viscosity is 20, 9.8 and 2.4 mPa·s at 120, 160 and 265° C., respectively. Surface tension can be estimated via Queimada Equation by viscosity data (15th Symp. on Thermophysical Properties, 2003). The three-phase reactor's liquid (mainly iso-butane) surface tension is in the range of 0.0032 to 0.0037 N/m, which is about half of the range for F-T liquid (estimated to be 0.007 to 0.008 N/m). That means the three-phase reactor is more likely to foam than slurry F-T reactors. Table 6 shows the results of these simulations.

TABLE 6

|  | Case | | | | |
| --- | --- | --- | --- | --- | --- |
|  | 1 | 2 | 3 | 4 | 5 |
| Gas Density (lb/ft3) | 3.8 | 4 | 3.43 | 2.26 | 2.94 |
| Superficial Gas velocity (ft/s) | 1.2 | 1.2 | 1.2 | 1.2 | 1.2 |
| Temperature (° C.) | 90 | 90 | 85 | 85 | 85 |
| Pressure (psia) | 414.7 | 414.7 | 335.2 | 335.2 | 335.2 |
| Gas viscosity (Pa-s) | 1.32E−05 | 1.25E−05 | 1.18E−05 | 1.38E−05 | 1.40E−05 |
| Particle size Dp (inch) | 0.02 | 0.024 | 0.033 | 0.019 | 0.021 |
| Slurry Bed Density (SBD) (lb/ft3) | 27 | 24.5 | 31 | 22 | 24 |
| Particle sphericity | 0.75 | 0.8 | 0.85 | 0.7 | 0.7 |
| Voidage at SBD | 0.457 | 0.447 | 0.438 | 0.467 | 0.467 |
| Particle density (kg/m3) | 795 | 709 | 883 | 661 | 721 |
| Liquid density (kg/m3) | 468 | 463 | 472 | 533 | 511 |
| Liquid Velocity (m/s) | 0 | 0 | 0 | 0 | 0 |
| Particle Holdup (vol %) | 38.1% | 38.1% | 38.1% | 38.1% | 38.1% |
| Gas Holdup (vol %) | 30.5% | 30.6% | 30.2% | 30.9% | 30.7% |
| Liquid Holdup (vol %) | 31.3% | 31.2% | 31.6% | 31.0% | 31.2% |
| Fluidized Bulk Density (lb/ft3) - solid only | 18.9 | 16.9 | 21.0 | 15.7 | 17.2 |
| Reactor Diameter (ft) | 14 | 14 | 14 | 14 | 14 |
| Three-phase reaction zone Bed Height (ft) | 50 | 50 | 50 | 50 | 50 |
| Bed inventory (lb) | 145738 | 129920 | 161773 | 121118 | 132129 |
| Production rate (lb/hr) | 138000 | 138000 | 138000 | 138000 | 138000 |
| Residence time (hr) | 1.06 | 0.94 | 1.17 | 0.88 | 0.96 |
| Average Bubble Size (in.) | 1.6 | 1.6 | 1.7 | 1.6 | 1.6 |

Results of the above simulations indicate that, based on calculated fluidized bulk density of the solids (~16-21 lb/ft$^3$) and an average bubble size of 1.6 inches, good fluidization characteristics can be achieved with 3-phase reaction systems according to embodiments disclosed herein. For operations close to the point of foaming, additional anti-foaming considerations, such as use of anti-foaming additives, may be prudent.

Example 4

Figure 5:
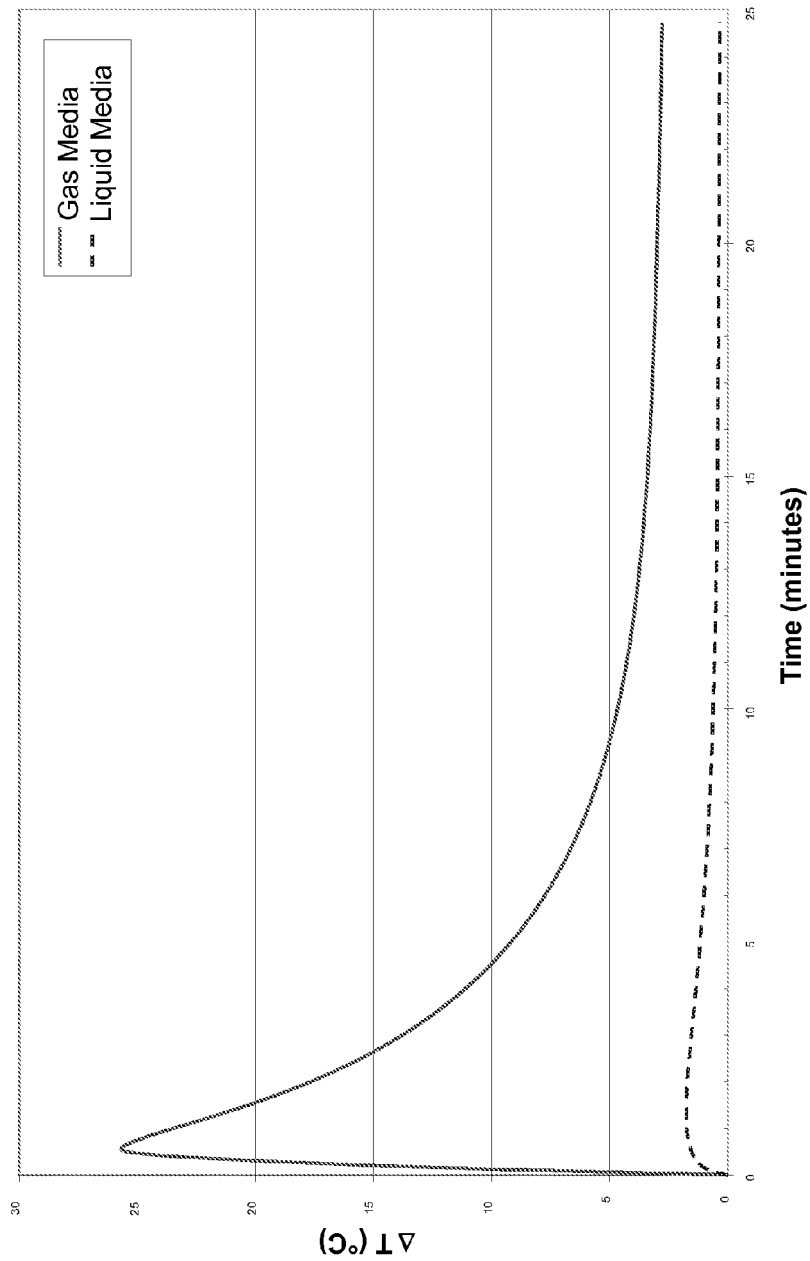
FIG. 5 is a plot of temperature versus time for gas and liquid media.

A comprehensive model was developed to determine single catalyst particle temperature rise, to identify any potential benefits of three-phase system versus gas-phase noting that the three phase reactor provides a liquid phase. In this model, heat and mass balance equations are used to determine single particle temperature rise and dimensionless variables are used. FIG. 5 shows relative effect of liquid vs. gas media on catalyst particle temperature.

The results of the particle model show that the three phase reactor vastly improves single particle temperature control, providing a lower temperature gradient across the particle. More significantly, the peak particle temperature is dramatically lower. This is attributed to the higher thermal conductivity of the liquid and lower diffusion rate of ethylene in the liquid. The simulation shows a total absence of multiple steady states in the liquid media case (unstable high temperature branch point does not exist). Also, the catalyst particle clusters, a major cause of particle exotherm, are less likely in liquid media due to static dissipation in liquid media.

The above-described three-phase polymerization reactor systems and processes may provide one or more advantages as compared to other polyolefin polymerization processes, such as low transition costs, increased capacity, handling of high activity catalysts, and/or production of new products, among others. The three-phase polymerization reaction system may allow the production of a wide range of products by using higher alpha-olefins, the potential for use of very high activity catalysts and use of catalysts with positive activation energies, enhanced reactor operability due to improved heat transfer and essentially the elimination of electrostatics.

Further with regard to increased capacity, three-phase reactor systems according to embodiments disclosed herein may have the flexibility for higher rates due to improved heat removal capability of the diluent (evaporation) which will be discussed in the sections below. The unit capacity of a polymerization reactor system is generally limited by catalyst productivity at low residence times. Three-phase reactors systems according to embodiments disclosed herein are suitable for high activity catalysts that can be operated at low residence time which leads to high capacity.

With regard to catalyst delivery systems, it is feasible that the catalyst delivery system can be simplified to a single delivery platform, for example solution feed or slurry feed, for use with three-phase reactor systems according to embodiments disclosed herein. A switch to one catalyst delivery platform, e.g. slurry or solution, lowers the catalyst preparation costs as well as equipment costs. Adapting polymerization catalysts for use in gas-phase reactor, for example, requires sometimes lengthy R&D development with regard to choice of support, kinetic profile, etc. However, with the three-phase reaction system, it is believed that catalyst development time can be reduced by eliminating the support. Also, as a result of the three-phase reaction system liquid diluent and improved heat transfer capability, it is believed that high activity catalyst of much greater than 20,000 kg polymer per kg catalyst can be used effectively.

One of the potential benefits of three-phase polymerization reactions systems disclosed herein is the capability to reduce bed level and completely emptying the reactor during transitions between products or catalyst families. Low bed level transitions are risky with current gas-phase reaction system due to the potential for sheeting. For example: the three-phase reactor can reduce the cost of transitions within same catalyst family by 50% versus standard gas-phase reactor by using low bed level transitions. Transitions between incompatible catalysts sometimes require bed discharge and recharge with gas-phase type processes. In three-phase reaction systems disclosed herein, it is expected that this transition time can be reduced by 30 to 50% of that needed by standard gas-phase processes. This benefit in the three-phase reaction system can be achieved by emptying the reactor completely and refilling with fresh diluent during start-up.

Sheeting, formation of chunks, and reactor discontinuity events are common in traditional gas-phase reaction systems as a result of static and or excessive heating of polymer particles resulting in polymer softening and agglomeration. Liquid pool processes are also known to result in sheeting and fouling of overhead condenser systems. Three-phase reactor systems according to embodiments disclosed herein may avoid or decrease the occurrence of fouling, sheeting, and other shut-down events, in the gas circulation system and in the reactor. Gas velocities for a three-phase reaction system are typically low, resulting in negligible entrainment. Heat removal from catalyst/polymer particles and static dissipation should also be significantly better within the liquid diluent reaction medium.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention. While the invention has been described with respect to a number of embodiments and examples, those skilled in the art, having benefit of this disclosure, will appreciate that other embodiments can be devised which do not depart from the scope and spirit of the invention as disclosed herein.

The invention claimed is:

1. A process for the polymerization of olefins, comprising:
feeding a catalyst, a liquid diluent, and an olefin to a polymerization vessel having, from a polymerization vessel bottom to a polymerization vessel top, a vapor introduction zone, a three-phase reaction zone and a vapor disengagement zone;
contacting the catalyst and olefin under conditions of temperature and pressure in the presence of the liquid diluent as a continuous phase in the three-phase reaction zone to form a solid phase polyolefin;
withdrawing a gas phase composition from an outlet in fluid communication with the vapor disengagement zone;
circulating the gas phase composition through a gas circulation loop to an inlet in fluid communication with the vapor introduction zone at a rate sufficient to agitate the solid and liquid phases within the three-phase reaction zone;
withdrawing a reaction mixture comprising polyolefin and diluents from the three-phase reaction zone.

2. The process of claim 1, further comprising separating the withdrawn reaction mixture into a diluents liquid phase fraction and a polyolefin solid phase fraction.

3. The process of claim 1, further comprising reducing a temperature of the circulating gas phase composition via indirect heat exchange.

4. The process of claim 1, further comprising introducing at least one of a co-catalyst, an activator, an antistatic agent, an anti-foaming agent, a chain transfer agent, a comonomer, and make-up diluent to at least one of the polymerization vessel and the gas circulation loop.

5. The process of claim 1, wherein the catalyst is fed to the three-phase reaction zone of the polymerization vessel and wherein the olefin is indirectly fed to the polymerization vessel via the gas circulation loop.

6. The process of claim 1, wherein the withdrawn gas phase composition comprises diluent and olefin, the process further comprising:
condensing at least a portion of the diluent in an overheads condenser; and
recycling at least a portion of the condensed diluent to the three-phase reaction zone.

7. The process of claim 6, further comprising recycling at least a portion of the diluents liquid phase fraction to at least one of the three-phase reaction zone and the overheads condenser.

8. The process of claim 1, further comprising recycling at least a portion of the diluents liquid phase fraction to the three-phase reaction zone.

9. The process of claim 1, wherein the withdrawn gas phase composition comprises at least one of entrained liquids and entrained solids.

10. The process of claim 9, further comprising separating the at least one of entrained liquids and entrained solids from the gas phase composition.

11. The process of claim 1, the polymerization vessel comprising two or more three-phase reaction zones, two or more vapor introduction zones, and two or more vapor disengagement zones, where each of the two or more three-phase reaction zones are in fluid communication with an associated vapor introduction zone and an associated vapor disengagement zone.

12. The process of claim 11, further comprising:
withdrawing a gas phase composition from an outlet in fluid communication with each associated vapor disengagement zone; and individually circulating the withdrawn gas phase compositions through a gas circulation loop to an inlet in fluid communication with the associated vapor introduction zone at a rate sufficient to agitate the solid and liquid phases within the three-phase reaction zone.

13. The process of claim 12, further comprising transporting a reaction mixture comprising polyolefin and diluents from one of the two or more three-phase reaction zones to another of the two or more three-phase reaction zones.

14. The process of claim 11, wherein the withdrawing a gas phase composition is from an outlet in fluid communication with an uppermost vapor disengagement zone, and wherein the circulating the gas phase composition is to an inlet of a lowermost vapor distribution zone.

15. The process of claim 1, further comprising operating the three-phase reaction zone at a boiling point of the liquid diluent to thereby maintain the three-phase reaction zone at substantially isothermal conditions.

16. The process of claim 1, wherein the olefin comprises at least one of ethylene and propylene.

17. The process of claim 16, wherein the olefin further comprises a polymerizable macromer.

18. A continuous three-phase polymerization reaction system, comprising:
   a polymerization vessel having, from a polymerization vessel bottom to a polymerization vessel top, a vapor introduction zone, a three-phase reaction zone for a polymerization reaction in a liquid-continuous medium, and a vapor disengagement zone;
   a gas circulation loop for circulating a gas phase composition from an outlet in fluid communication with the vapor disengagement zone to an inlet in fluid communication with the vapor introduction zone at a rate sufficient to agitate solids and liquids within the three-phase reaction zone;
   a fluid inlet for introducing a polymerization catalyst to the three-phase reaction zone;
   a fluid inlet for introducing an olefin to the reactor to form a solid phase polyolefin via contact with the polymerization catalyst;
   a fluid outlet for withdrawing a reaction mixture comprising polyolefin and diluents from the three-phase reaction zone; and
   a separation device for separating entrained liquids from the gas phase composition withdrawn from the vapor disengagement zone.

19. The reaction system of claim 18, further comprising a separator for separating the withdrawn reaction mixture into a diluents fraction and a polyolefin fraction.

20. The reaction system of claim 18, further comprising a circulating device for transporting at least a portion of the gas phase composition through the gas circulation loop.

21. The reaction system of claim 18, further comprising at least one heat exchanger to recover heat from the circulating gas phase composition.

22. The reaction system of claim 18, further comprising one or more fluid conduits for introducing at least one of a co-catalyst, an anti-foaming agent, an activator, an antistatic agent, a chain transfer agent, a comonomer, and liquid diluent to at least one of the polymerization vessel and the circulation loop.

23. The reaction system of claim 18, further comprising:
   an overheads condenser system for reducing a temperature of the circulating gas phase composition via indirect heat exchange to condense at least a portion of the diluents; and
   a fluid conduit for recycling at least a portion of the condensed diluents to the three-phase reaction zone.

24. The reaction system of claim 23, further comprising a fluid conduit for recycling at least a portion of the diluents fraction to at least one of the three-phase reaction zone and the overheads condenser.

25. The reaction system of claim 18, further comprising a separation device for separating entrained liquids and entrained solids from the gas phase composition withdrawn from the vapor disengagement zone.

26. The reaction system of claim 18, the polymerization vessel comprising two or more three-phase reaction zones, two or more vapor introduction zones, and two or more vapor disengagement zones, where each of the two or more three-phase reaction zones are in fluid communication with an associated vapor introduction zone and an associated vapor disengagement zone.

27. The reaction system of claim 26, further comprising two or more gas circulation loops for circulating a gas phase composition from an outlet in fluid communication with a vapor disengagement to an inlet in fluid communication with the associated vapor introduction zone at a rate sufficient to agitate solids and liquids within the associated three-phase reaction zone.

28. The reaction system of claim 27, further comprising a fluid conduit for transporting a reaction mixture comprising polyolefin and diluents from one of the two or more three-phase reaction zones to another of the two or more three-phase reaction zones.

29. The reaction system of claim 26, comprising a single gas circulation loop for circulating the gas phase composition from an outlet in fluid communication with an uppermost vapor disengagement zone to an inlet of a lowermost vapor introduction zone.

30. A polymerization reaction system comprising two or more reaction systems as defined in claim 18 configured for at least one of parallel and series operation.

* * * * *